United States Patent
Tobergte et al.

(10) Patent No.: US 7,099,423 B2
(45) Date of Patent: Aug. 29, 2006

(54) METHOD AND CIRCUIT ARRANGEMENT FOR DETECTING SYNCHRONIZATION PATTERNS IN A RECEIVER

(75) Inventors: Wolfgang Tobergte, Halstenbek (DE); Stephan De Zeeuw, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 713 days.

(21) Appl. No.: 10/204,744

(22) PCT Filed: Jan. 8, 2002

(86) PCT No.: PCT/IB02/00036

§ 371 (c)(1),
(2), (4) Date: Aug. 23, 2002

(87) PCT Pub. No.: WO02/056485

PCT Pub. Date: Jul. 18, 2002

(65) Prior Publication Data

US 2003/0054785 A1    Mar. 20, 2003

(30) Foreign Application Priority Data

Jan. 9, 2001    (DE) .............................. 101 00 570

(51) Int. Cl.
*H04L 7/00* (2006.01)
(52) U.S. Cl. ....................................................... 375/368
(58) Field of Classification Search ............... 375/294, 375/376, 136, 147, 368, 316, 340, 354, 362–366; 455/180.3; 370/503–514; 348/497, 500, 348/725–727; 327/141, 154, 161
See application file for complete search history.

(56) References Cited

U.S. PATENT DOCUMENTS

| | | | |
|---|---|---|---|
| 3,770,987 A * | 11/1973 | McSweeney | 327/262 |
| 4,011,408 A * | 3/1977 | Miller, III | 380/36 |
| 4,194,153 A | 3/1980 | Masaki et al. | 455/31 |
| 4,745,408 A | 5/1988 | Nagata et al. | 340/825.44 |
| 4,794,649 A * | 12/1988 | Fujiwara | 455/9 |
| 4,912,726 A * | 3/1990 | Iwamatsu et al. | 375/294 |
| 5,428,820 A | 6/1995 | Okada et al. | 455/38.3 |
| 5,491,713 A | 2/1996 | Kwok et al. | 375/333 |
| 5,781,064 A * | 7/1998 | Chang-An et al. | 329/300 |
| 6,084,452 A * | 7/2000 | Drost et al. | 327/175 |
| 6,249,159 B1 * | 6/2001 | Johnson | 327/157 |
| 6,496,555 B1 * | 12/2002 | Soda | 375/376 |
| 2001/0004605 A1 * | 6/2001 | Miyano et al. | 455/562 |

\* cited by examiner

*Primary Examiner*—Tesfaldet Bocure
(74) *Attorney, Agent, or Firm*—Adam L. Stroud

(57) ABSTRACT

Radio frequency receivers are implemented in a variety of embodiments. In one such embodiment, a radio frequency receiver is implemented for detecting synchronization patterns in a receiver, particularly in a UHF receiver or a VHF receiver, by which the average current consumption in a system with a receiver, particularly a UHF receiver or a VHF receiver, and with a subsequently arranged controller unit can be reduced. Using a slope detector and by taking the signal state in a shift register, the radio frequency receiver may be implemented by synchronizing a clock recovery unit with an incoming signal. The shift register pattern can be compared against a predetermined pattern, and when the patterns correspond to the pattern of each other or to the completely inverted pattern of the other, the signal is enabled for further processing in a controller unit.

23 Claims, 1 Drawing Sheet

METHOD AND CIRCUIT ARRANGEMENT FOR DETECTING SYNCHRONIZATION PATTERNS IN A RECEIVER

BACKGROUND OF THE INVENTION

The present invention relates to a method and a circuit arrangement for detecting synchronization patterns in a receiver, particularly a UHF receiver (UHF=ultra high frequency) or a VHF receiver (VHF=very high frequency).

In a multitude of radio systems currently used on a UHF or VHF basis, the high-frequency signal picked up by an antenna is applied to a UHF receiver or a VHF receiver in conformity with the reception bandwidth and the reception frequency. The demodulated and digitized low-frequency signal is passed on via a data output to a connected controller unit, particularly a microcontroller unit, for further processing.

The decision whether the demodulated and digitized signal is a valid data signal or only digital noise is entirely taken by the controller unit in these conventional systems. In this respect, it is to be noted that a multitude of transmission units having the same carrier frequency is used in the frequency range of the Industrial, Scientific and Medical (ISM) bands so that the controller unit receives a multitude of additional signals which do not originate from the desired transmission unit at all.

The above-described conventional systems have in common that, fundamentally, both system components, i.e. both the UHF or VHF receiver and the controller unit must be permanently or at least predominantly operative for the reasons mentioned above. This fact is particularly a drawback in those conventional systems in which a low average current consumption is required, for example, in battery-operated conditions.

SUMMARY OF THE INVENTION

It is an object of the invention to provide a method and a circuit arrangement of the type described in the opening paragraph by which the average current consumption in a system with a receiver, particularly a UHF receiver or a VHF receiver, and with a subsequently arranged controller unit can be clearly reduced.

This object is achieved by a method as defined in claim 1 and by a circuit arrangement as defined in claim 11. Advantageous embodiments and further implementations of the present invention are defined in the dependent claims.

In accordance with the teaching of the present invention, a significant reduction of the average current consumption can be achieved in that the received demodulated signal is evaluated by the receiver, particularly the UHF receiver or VHF receiver so that the controller unit can remain in a current-saving standby or sleep mode when the signal is received. The controller unit is only impressed with the signal and thereby further switched on when the receiver detects a given pattern, particularly a synchronization pattern, in the demodulated signal and thus concludes that there is a valid data signal rather than for example, only digital noise.

In contrast to the circuit arrangements already known (cf., for example, the prior-art U.S. Pat. Nos. 4,194,153; 4,745,408 or 5,428,820), the present invention utilizes the fact that the protocols of most radio broadcast systems have synchronization patterns which are set before the start of each data signal and are used for distinguishing valid data signals from digital noise and/or for detecting whether the received data signal originates from the desired transmission unit.

In accordance with an advantageous embodiment of the present invention, the data clock generated by the clock recovery unit is not applied to an output assigned to the data clock until after the signal state pattern picked up by the shift register and possibly also completely inverted is compared with the predetermined state pattern, for example, by way of an AND combination with the decision signal originating from the decision unit.

Independently thereof, or in addition thereto, it is not necessary that the controller unit is switched on again through a data line preceded by the AND circuit when a valid data pattern or state pattern is detected, but may also be effected through another control line, for example, through a data clock line subsequent to the clock recovery unit.

In connection with the subject matter of the present invention it should be noted that the shift register plays an essential role both in the method and in the circuit arrangement according to the invention. The shift register is essentially a serial information memory which may comprise a plurality of serially arranged memory cells, for example flipflops, with each memory cell being generally capable of storing a bit.

The information contents of each memory cell can be essentially shifted from memory cell to memory cell by the clock signal, i.e. from the input of the shift register to the output of the shift register. Due to the serial input, there is direct access only to the first memory cell in the chain in the shift register so that the time of access to the information is larger than, for example, in a parallel register.

The shift register is preferably formed as a switching circuit for which, for example, the CCD technique (CCD=charge-coupled device) is suitable for realizing very long shift registers up to 64 kbit.

The present invention also relates to an integrated circuit, particularly a controller unit controlled by at least a circuit arrangement as described hereinbefore.

These and other aspects of the invention are apparent from and will be elucidated with reference to the embodiments described hereinafter.

DETAIL DESCRIPTION OF THE INVENTION

Figure 1:
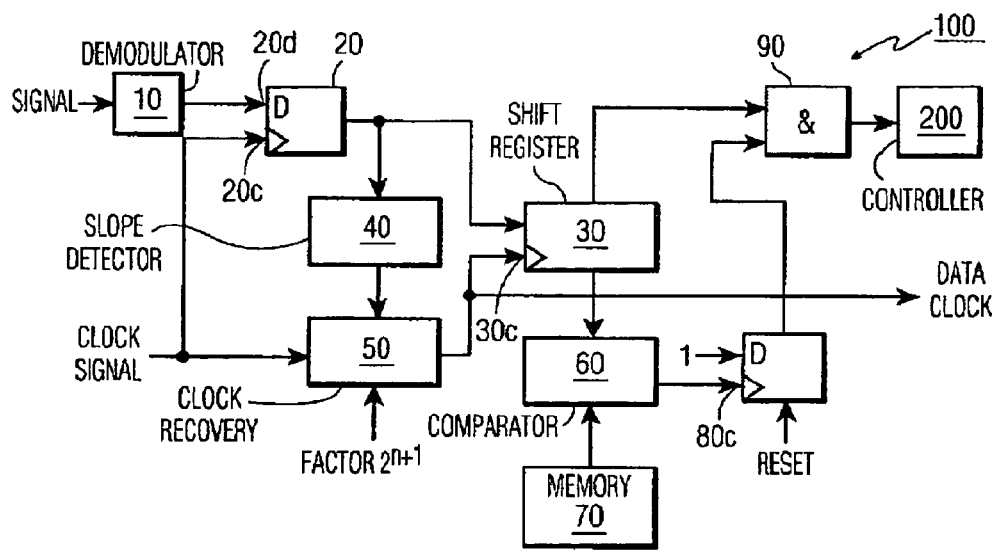
FIG. 1 shows diagrammatically an embodiment of a circuit arrangement according to the invention.

The circuit arrangement 100 shown in FIG. 1 is adapted to detect synchronization patterns (an 8-bit synchronization pattern in this embodiment; cf. FIG. 2) in a UHF receiver or a VHF receiver.

A digitized signal picked up by an antenna (not shown in FIGS. 1 to 3 for reasons of clarity) demodulated by a demodulator 10 is received by the D input 20d of a first D(elay)-flipflop unit 20, synchronized with a clock signal received by the clock input 20c of the first D-flipflop unit 20 and applied to the input of a shift register 30.

Figure 2:
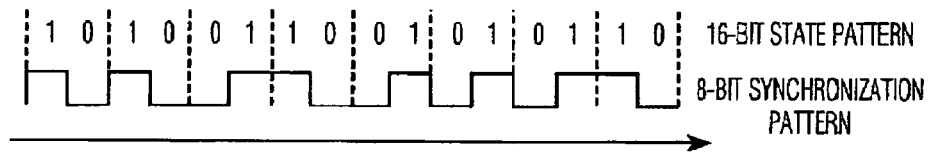
FIG. 2 shows a diagram in which the storage of state patterns and the resultant synchronization patterns are illustrated.

The length of the shift register 30 is determined by the length of the signal state pattern to be detected (a 16-bit state pattern in this embodiment; cf. FIG. 2). The instantaneous state of the signal is taken over in the shift register 30 upon each slope generated by the clock recovery unit 50.

It should be noted with respect to FIG. 2 that each data bit in the synchronization pattern is described by two consecutive states ("0" or "1", or "low" or "high") and stored in a pattern memory 70 (cf. FIG. 1). Since the overall depth of the pattern memory 70 is larger by a factor of 2 than the number of bits of the synchronization pattern, a 16-bit state pattern is obtained.

The stored states of the shift register 30 are now continuously compared with the defined, predetermined values of the pattern memory 70. Only when the signal state pattern picked up by the shift register 30 and possibly also completely inverted entirely corresponds to the state pattern in pattern memory 70 is the signal enabled for further processing in a controller unit 200 (cf. FIG. 1). In this case, the data clock generated by the clock recovery unit 50 can also be used by the subsequent circuit, for example, by the subsequent controller unit 200.

Particularly for the release of the signal, a decision unit 60 is arranged for further processing in the controller unit 200 between the shift register 30 and the pattern memory 70, which decision unit is arranged subsequent to a second D-flipflop unit 80 having a reset facility, whose clock input 80c is connected to the output of the decision unit 60.

The signal is enabled by an AND circuit 90 arranged subsequent to the shift register 30 and the second D-flipflop unit 80, which AND circuit has its first input connected to the output of the shift register 30 and its second input connected to the output of the second D-flipflop unit 80, and whose output can supply the signal for further processing when the signal state pattern picked up by the shift register 30 and possibly also completely inverted corresponds to the predetermined state pattern.

For a concrete realization of the synchronization process, the clock recovery unit 50 is particularly constituted as a dual counter having a length n, which is controlled by means of the clock signal and at which the frequency of the clock signal is a factor of $2^{n+1}$ larger than the frequency of the signal itself (however, according to the invention, it is alternatively possible to set the frequency of the clock signal to an arbitrary different value than the $2^{n+1}$-fold value of the signal). Upon every overflow of the clock recovery unit 50, a slope is generated at its output (for completeness' sake it is to be noted that the invention also provides the possibility of a take-over of the signal in the shift register 30 also at instants other than the instant of the counter overflow).

Figure 3:
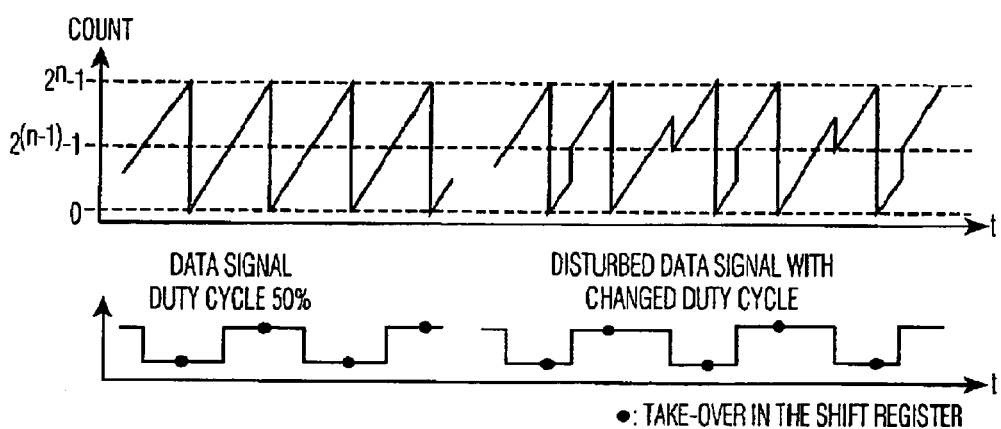
FIG. 3 shows a diagram in which the clock recovery by means of the clock recovery unit for the shift register is plotted against time.

A slope occurring in the signal now resets the count of the clock recovery unit 50 to the value $2^{n-1}-1$ (cf. FIG. 3). In accordance with an optional embodiment of the circuit arrangement 100 it is also possible to reset the count of the clock recovery unit 50 to a value which is not equal to $2^{n-1}-1$ when there is a slope in the signal, which value can be computed, for example, by means of averaging in accordance with the digital signal theory, so that the clock recovery unit 50 is synchronized with the signal (for synchronization of the clock recovery unit 50, the invention also provides the possibility of evaluating only slope information, i.e. a positive slope or a negative slope) and any jitter or duty cycle can be compensated in the signal with deviations which are smaller than one fourth of a bit period (cf. FIG. 3). This also compensates deviations between the bit rate of the signal and the clock signal.

LIST OF REFERENCE SIGNS 100 circuit arrangement
10 demodulator unit
20 first D(elay)-flipflop unit
20c clock input of the first D-flipflop unit 20
20d D input of the first D-flipflop unit 20
30 shift register
30c clock input of the shift register 30
40 slope detector
50 clock recovery unit
60 decision unit
70 pattern memory
80 second D-flipflop unit
80c clock input of the second D-flipflop unit 80
90 AND circuit
200 controller unit

The invention claimed is:

1. A method of detecting synchronization patterns in a receiver, particularly a UHF receiver or a VHF receiver, the method comprising the following successive and/or simultaneous steps:

synchronizing at least a clock recovery unit with an incoming signal;

impressing, particularly successively impressing at least a shift register with the signal, generating slopes from the signal by means of at least a slope detector and/or by means of the clock recovery unit preceded by the slope detector, and picking up or taking over the slope-determined instantaneous state of the signal in the shift register;

comparing, particularly continuously comparing the state pattern assumed by the shift register with a predetermined state pattern stored in at least a pattern memory;

enabling the signal for the further processing particularly in at least a controller unit when the state pattern assumed by the shift register and possibly also completely inverted corresponds to the predetermined state pattern.

2. A method as claimed in claim 1, characterized in that the signal is demodulated before synchronization by means of at least a demodulator unit.

3. A method as claimed in claim 1, characterized in that the clock recovery unit is controlled by means of a clock signal having a frequency which is higher than the frequency of the signal.

4. A method as claimed in claim 1, characterized in that only the negative slope information and/or only the positive slope information is evaluated for synchronizing the clock recovery unit.

5. A method as claimed in claim 1, characterized in that, upon each overflow of the clock recovery unit, a slope is generated at the output of the clock recovery unit and/or the signal is taken over in the shift register.

6. A method as claimed in claim 1, characterized in that the clock recovery unit is reset to the value $2^{n-1}-1$ by a slope in the incoming signal.

7. A method as claimed in claim 1, characterized in that, by a slope in the incoming signal, the clock recovery unit is reset to a value computed by way of averaging in accordance with the digital signal theory.

8. A method as claimed in claim 1, characterized in that the state pattern taken up by the shift register is compared with the predetermined state pattern in at least a decision unit.

9. A method as claimed in claim 1, characterized in that the data clock generated by the clock recovery unit is also further processed in the controller unit.

10. A method as claimed in claim 9, characterized in that the data clock generated by the clock recovery unit is not applied to the output of the circuit arrangement until after the state pattern of the signal corresponds to the predetermined state pattern.

11. A circuit arrangement for detecting synchronization patterns in a receiver, particularly a UHF receiver or a VHF receiver, the circuit arrangement comprising
at least a shift register
whose input can be impressed with an incoming signal and
which is provided for picking up or taking over the signal state pattern particularly determined by the slopes;
at least a slope detector whose input can also be impressed with the incoming signal; at least a clock recovery unit to be synchronized with the signal and preceded by the slope detector, the output of said clock recovery unit being connected to the clock input of the shift register; and
at least a decision unit preceded by the shift register for comparing, particularly continuously comparing, the signal state pattern picked up by the shift register and possibly also completely inverted with a predetermined state pattern stored in at least a pattern memory assigned to the decision unit.

12. A circuit arrangement as claimed in claim 11, characterized in that both the shift register and the slope detector are preceded by at least a first D(elay)-flipflop unit.

13. A circuit arrangement claimed in claim 12, characterized in that
the D input of the first D-flipflop unit is preceded by at least a demodulator unit, and
the D input of the first D-flipflop unit can be impressed with the signal.

14. A circuit arrangement as claimed in claim 12, characterized in that
both the clock input of the first D-flipflop unit and
the input of the clock recovery unit can be impressed with a clock signal.

15. A circuit arrangement as claimed in claim 14, characterized in that the frequency of the clock signal is larger by a factor of $2^{n+1}$ than the frequency of the signal, in which n is the length of the clock recovery unit.

16. A circuit arrangement as claimed in claim 11, characterized in that the clock recovery unit is formed as at least a dual counter.

17. A circuit arrangement as claimed in claim 11, characterized in that the slope detector and/or the clock recovery unit are provided for generating slopes from the signal.

18. A circuit arrangement as claimed in claim 11, characterized in that the overall depth of the pattern memory is larger by a factor of 2 than the number of bits of the synchronization pattern.

19. A circuit arrangement as claimed in claim 11, characterized in that the decision unit precedes at least a second D-flipflop unit whose clock input is connected to the output of the decision unit.

20. A circuit arrangement as claimed in claim 19, characterized in that the shift register and the second D-flipflop unit precede at least an AND circuit,
having a first input which is connected to the output of the shift register,
a second input which is connected to the output of the second D-flipflop unit, and
an output which can supply the signal for further processing particularly in at least a controller unit when the signal state pattern picked up by the shift register and possibly also completely inverted corresponds to the predetermined state pattern.

21. A circuit arrangement as claimed in claim 20, characterized in that the controller unit can be impressed with the data clock generated by the clock recovery unit.

22. A circuit arrangement as claimed in claim 11, characterized in that the length of the shift register is determined by the length of the signal state pattern to be detected.

23. An integrated circuit, particularly a controller unit, controlled by at least a circuit arrangement as claimed in claim 11.

* * * * *